(No Model.)
H. H. PARKHILL.
APPARATUS FOR RAISING DOUGH.
No. 371,702. Patented Oct. 18, 1887.
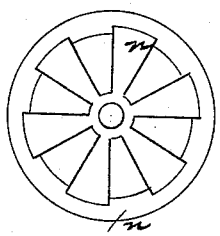
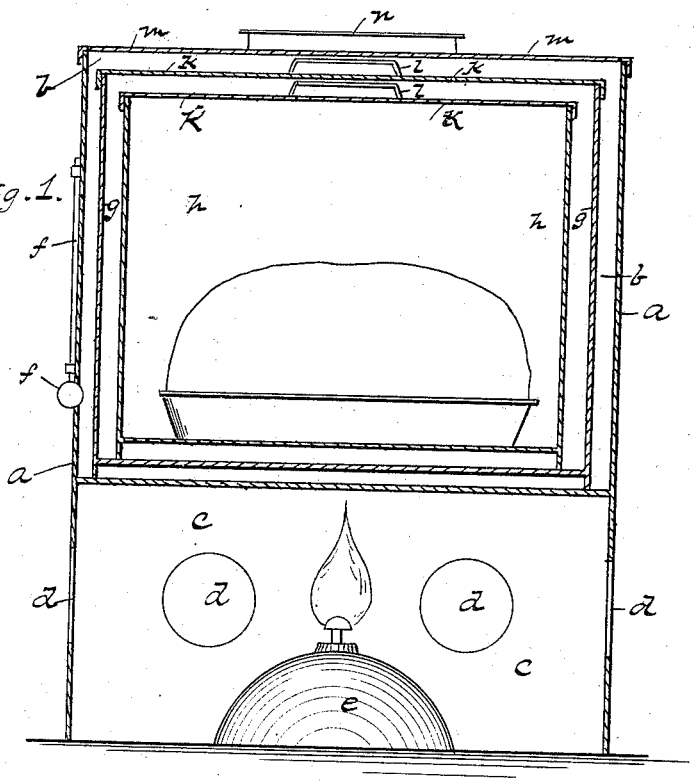

UNITED STATES PATENT OFFICE.

HUGH H. PARKHILL, OF VANDERBILT, PENNSYLVANIA.

APPARATUS FOR RAISING DOUGH.

SPECIFICATION forming part of Letters Patent No. 371,702, dated October 18, 1887.

Application filed February 3, 1887. Serial No. 226,447. (No model.)

*To all whom it may concern:*

Be it known that I, HUGH H. PARKHILL, a citizen of the United States, residing at Vanderbilt, in the county of Fayette and State of Pennsylvania, have invented certain new and useful Improvements in Apparatus for Raising Dough; and I do hereby declare the following to be a full, clear, and exact description of the invention, such as will enable others skilled in the art to which it pertains to make and use the same, reference being had to the accompanying drawings, which form a part of this specification.

My invention is an improvement in an apparatus for raising dough, the object being to provide a means whereby dough may be easily and rapidly raised preparatory to placing the same in an oven for baking; and with this end in view my invention consists in certain details of construction and combination of parts, as will be fully set forth hereinafter.

In the accompanying drawings, Figure 1 is a sectional elevation of my apparatus constructed in accordance with my invention. Fig. 2 is a plan view of the air-register placed on the top of the same.

To put my invention into practice I provide a strong metallic box, $a$, divided into two or more compartments, $b$ $c$, open at the top and bottom. Through the walls of the lower compartment, $c$, I form a number of openings, $d$, for the purpose of admitting air to a lamp, $e$, or other heating device placed therein. In the upper compartment, $b$, I arrange a thermometer, $f$, in such a manner as to admit of the degrees of temperature being read from the outside. In this top compartment, $b$, I place two smaller boxes, $g$ $h$, each provided with a lid, $k$, and handle $l$. The lid $m$, covering the outside box, $a$, I provide with an air-register, $n$, whereby the temperature of the inner chambers is raised or lowered by opening or closing the same.

In operation a burning lamp, $e$, or other source of heat is placed in the lower compartment, $c$, of the apparatus. The dough to be raised is placed in the smallest box, $h$, which is in turn placed within the next in size, $g$, and the whole placed in the upper chamber, $b$, of the apparatus. The lids $k$ $k$ and $m$ are placed in position and the dough raised quickly, the exact temperature being ascertained from the thermometer $f$ and regulated by the air-register $n$ above.

Having thus described my invention, what I claim, and desire to secure by Letters Patent, is—

1. The improved apparatus for raising dough, consisting of an outer box divided horizontally into two compartments, the lower one having apertures for the admission of air and the upper one having a cover provided with a regulator, as shown, the boxes in the upper compartment having removable covers and external air-spaces entirely around them, and a source of heat in the lower compartment, substantially as specified.

2. An apparatus for raising dough, having a heating-chamber, a box or receptacle for dough arranged above the same and surrounded by one or more boxes having interspaces between them, the outer box having a regulator for air and a thermometer whereby the temperature of the dough-chamber may be regulated, substantially as specified.

HUGH H. PARKHILL.

Witnesses:
M. E. HARRISON,
J. A. HERRON.